Jan. 10, 1950  J. R. FISH  2,493,757
LIQUID CONSUMPTION DEVICE
Filed Jan. 23, 1948
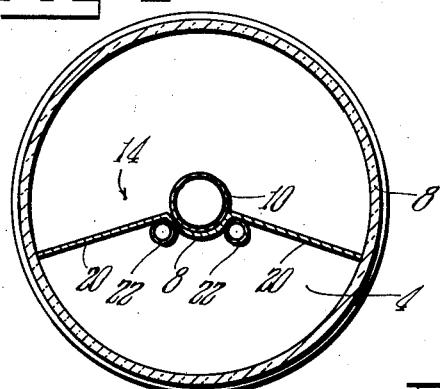
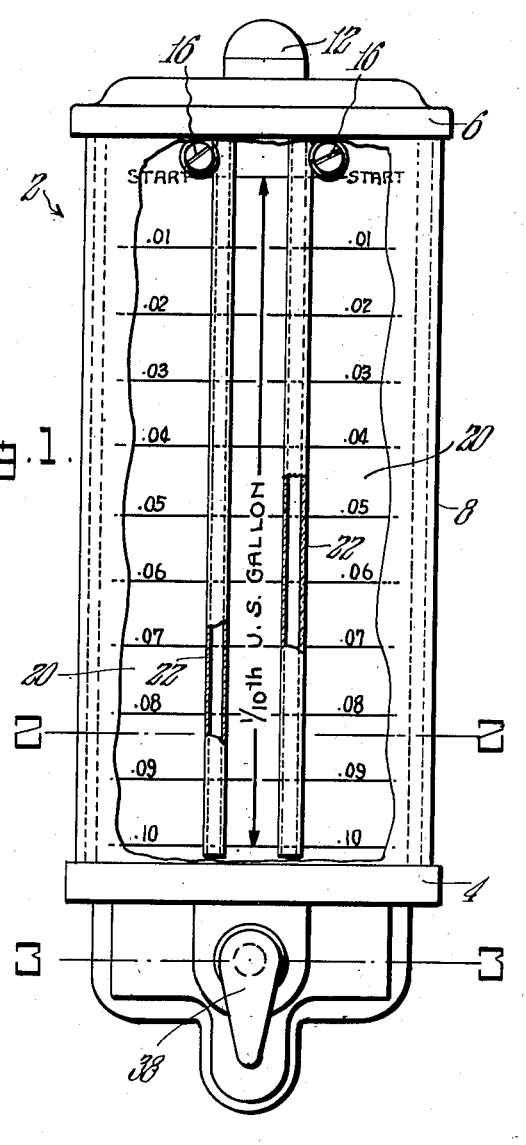
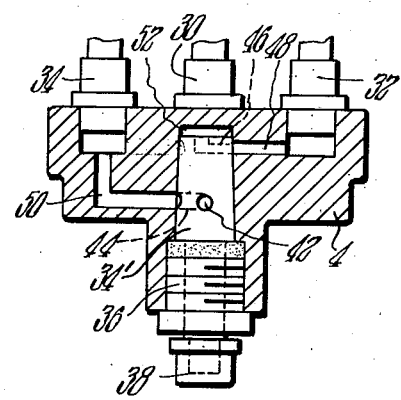
INVENTOR.
John Robert Fish.
BY Walter C Ross
Attorney.

Patented Jan. 10, 1950

2,493,757

UNITED STATES PATENT OFFICE 2,493,757

LIQUID CONSUMPTION DEVICE

John Robert Fish, Springfield, Mass.

Application January 23, 1948, Serial No. 3,928

5 Claims. (Cl. 73—113)

This invention relates to a liquid consumption device and is directed more particularly to apparatus for determining certain units relative to a certain quantity of liquid.

The apparatus of the invention is adapted for many and various uses but is particularly adapted for use in connection with internal combustion engines where it is desired to determine the number of certain operating units relative to a certain quantity of fuel. As an example, in connection with a motor vehicle it is possible to determine the number of miles per unit of fuel such as miles per gallon.

Accordingly, the principal object of the invention among numerous other novel objects and advantages is the provision of apparatus for determining the number of miles per gallon of fuel which an internal combustion engine of a vehicle is capable of.

The apparatus of the invention is constructed and arranged in a novel manner and may be easily and readily connected so as to deliver fuel to an internal combustion engine while at the same time it may be supplied with fuel from the fuel supply.

The consumption of fuel is visually indicated by the apparatus and it is readily possible to determine either the number of miles per unit of fuel or the quantity of fuel consumed in a certain number of miles operation while at the same time other and various calculations and determinations may be made. As important features the apparatus is self filling and may be connected so that the vacuum system of an engine may be utilized for the flow of fuel to the apparatus from the fuel supply.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a front elevational view of measuring apparatus embodying the novel features of the invention; and Figs. 2 and 3 are sectional plan views on the lines 2—2 and 3—3 respectively of Fig. 1.

Referring now to the drawings more in detail, the invention will be fully described.

The apparatus 2 of the invention in a general way includes a lower base 4 and an upper cap 6 between which is a tubular member 8.

The member 8 will preferably be made from transparent material such as glass or the like and opposite ends thereof will be sealed to adjacent sides of the base 4 and cap 6 in any desired and well known manner.

A central tubular member 10 has its lower end secured in the base while its upper end extends through the cap 6 and is threaded to receive an internally threaded nut 12. The nut 12 bears on the cap and the parts are held in such relation as to provide a closed chamber for fuel.

A target 14 is provided in the chamber which extends between the base and cap and it may be secured in place by any suitable means. In one way, upper screws 16 may extend through the target and engage with a clamp member at the rear of said member 10.

The tubular member, lower base and cap provide a chamber in which the target is disposed.

The central portion 18 of the target is preferably formed as shown in Fig. 2 to lie against the member 10 while opposite sides 20 thereof extend therefrom in an angular relation.

Sight tubes 22 preferably made from glass or the like are disposed in spaced relation and in parallelism with the member 10 at the forward side of the target 14. These members 22 may be secured in place by any suitable means but in one form of the invention their upper ends are disposed behind the members 16.

The sides 20 of the target are provided with vertically spaced graduations or horizontal lines which as shown have indicia adjacent thereto with indicia extending upwardly at the central portion of the target.

In the form of the invention shown, the graduations and indicia indicate an over-all capacity of one-tenth of a gallon and tenths of a tenth or hundredths of a gallon. Obviously any other arrangement of graduations and indicia may be employed that may be desired.

The upper and lower ends of the members 22 are open, the bores of the members 22 are relatively small, and the horizontal graduating lines extend behind the said members.

With the apparatus in a vehicle the level of fuel in the chamber due to movements of the vehicle is likely to fluctuate. The transverse area of the bores of members 22 being relatively small there is certain capillary attraction so that the level of fuel therein is stable and slightly above that in the chamber.

Even though the motion of the vehicle may cause the level of fuel in the chamber to fluctuate the target acts as a baffle to overcome this tendency and accurate level is shown by members 22.

The chamber may be filled to a point just above the "Start" graduation by connecting the device to the vacuum system of an engine. Then with the engine running, calculations may commence when the level has been reduced to the "Start" graduation thereby to facilitate accuracy in measurements.

Fuel may be delivered to the apparatus in various ways and delivered thereby to an internal combustion engine or the fuel feeding component thereof.

Fittings 30, 32 and 34 are associated with the base which may be connected to the fuel supply, vacuum system and fuel pump of a vehicle by pipes, as shown.

A valve 34' is rotatable in the base which has a stem 36 extending through a stuffing box 38. A manually engageable member 40 is secured to the stem 36 for turning the valve and said valve has ports 42, 44 and 46. Passageways 48, 50 and 52 in the body are provided and other passageways are provided into the chamber and member 10 which may have a passageway into the chamber.

The ports in the valve and passageways may be arranged in various ways in order that fuel may be fed to the chamber and delivered thereby to satisfy the demands of an internal combustion engine with which the apparatus is used.

The connections to an engine and the valve arrangement may take various forms as may be desired in order that fuel may be supplied the chamber and fed therefrom to the consuming unit.

It will be observed that the target may be provided with various indicia and graduations for various purposes and capacities of the chamber. The angularly disposed sides of the target and the sight tubes over the target and graduations readily facilitate the reading of the level of fuel within the chamber so that calculations for various purposes may be made.

The device may be secured to a vehicle or other apparatus with which the device is to be used by any suitable means such as a bracket engaging upper and lower sides of the device with which a suction cup or cups is associated.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus of the class described comprising in combination, an elongated transparent tubular member and lower and upper members forming a vertically disposed chamber for liquid, a target member extending upwardly in said chamber provided with graduations and indicia, a transparent hollow sight tube open at opposite ends disposed in said tubular member forwardly of said target member for liquid and in which liquid level may be observed, and means for delivering fuel to said chamber and for discharging the same therefrom.

2. Apparatus of the class described comprising in combination, an elongated transparent tubular member and lower and upper members closing the ends thereof forming therewith a vertical closed liquid chamber, a target extending upwardly in said chamber having vertically spaced graduations and indicia on the forward face thereof, a pair of vertically extending horizontally spaced elongated transparent open ended tubular sight members disposed in said chamber over said graduations which are visible therethrough, and means for admitting fuel to and discharging fuel from said chamber.

3. Apparatus of the class described comprising in combination, an elongated transparent vertically disposed tubular member and upper and lower members closing opposite ends thereof and providing therewith a closed liquid compartment, a central tubular member extending upwardly in said compartment substantially centrally thereof, a target extending upwardly in said compartment forwardly of said central member having on its forward face vertically spaced graduations and indicia, a pair of horizontally spaced vertically extending transparent open ended tubular sight members disposed in said compartment over the forward face of said target member, and means associated with said lower member for admitting liquid to and discharging it from said chamber.

4. Apparatus of the class described comprising in combination, an elongated transparent vertically disposed tubular member and upper and lower members closing opposite ends thereof and providing therewith a closed liquid compartment, a central tubular member extending upwardly in said compartment substantially centrally thereof, a target extending upwardly in said compartment forwardly of said central member having side portions extending forwardly therefrom in diverging relation from a central portion thereof, said side portions provided on their forward faces with vertically spaced graduations and indicia, separate elongated transparent open ended tubular sight members disposed adjacent forward faces of said side portions of the target and extending longitudinally thereof, said sight members being of relatively small diameter and being disposed over said graduations which are visible therethrough, and means associated with said lower member for admitting liquid to said compartment and discharging the same therefrom, all adapted and arranged whereby the level of liquid in said sight members is relatively free of spurious fluctuations of the level of liquid in said chamber.

5. Apparatus of the class described comprising in combination, an elongated transparent vertically disposed tubular member and upper and lower members closing opposite ends thereof and providing therewith a closed liquid compartment, a central tubular member extending upwardly of said compartment substantially centrally thereof, a target extending upwardly in said compartment forwardly of said central member having side portions extending forwardly therefrom in diverging relation from a central portion thereof, said side portions provided on their forward faces with vertically spaced graduations and indicia, separate elongated transparent open end tubular sight members disposed adjacent said forward faces of the side portions of the target and extending longitudinally thereof, said sight members being considerably less in diameter than said chamber and disposed over said graduations which are visible therethrough and adjacent thereto, and means associated with said lower member for admitting liquid to said compartment and discharging the same therefrom, all adapted and arranged whereby said means may be connected to a source of suction for filling said compartment with fuel and to an engine apparatus for consuming the same while said target functions as a baffle to reduce fluctuations of level of fuel caused by movement of the apparatus and fuel level is visualized in said sight members.

JOHN ROBERT FISH.

REFERENCES CITED

The following references are of record in the file of this patent:

UNITED STATES PATENTS

| Number | Name | Date |
| --- | --- | --- |
| 1,718,553 | Gauthier | June 25, 1929 |

FOREIGN PATENTS

| Number | Country | Date |
| --- | --- | --- |
| 64,125 | Germany | Feb. 2, 1892 |
| 99,949 | Sweden | Oct. 1, 1940 |